(12) United States Patent
Kang

(10) Patent No.: US 12,397,734 B2
(45) Date of Patent: Aug. 26, 2025

(54) AIRBAG ASSEMBLY

(71) Applicant: HYUNDAI MOBIS CO., LTD., Seoul (KR)

(72) Inventor: Dong Ho Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/774,297

(22) Filed: Jul. 16, 2024

(65) Prior Publication Data

US 2025/0145102 A1 May 8, 2025

(30) Foreign Application Priority Data

Nov. 3, 2023 (KR) .......... 10-2023-0150999

(51) Int. Cl.
| | |
|---|---|
| *B60R 21/232* | (2011.01) |
| *B60R 21/201* | (2011.01) |
| *B60R 21/215* | (2011.01) |
| *B60R 21/2342* | (2011.01) |
| *B60R 21/237* | (2006.01) |

(52) U.S. Cl.
CPC .......... *B60R 21/215* (2013.01); *B60R 21/201* (2013.01); *B60R 21/232* (2013.01); *B60R 21/2342* (2013.01); *B60R 21/237* (2013.01); *B60R 2021/21506* (2013.01)

(58) Field of Classification Search
CPC . B60R 21/232; B60R 21/2176; B60R 21/215; B60R 21/237; B60R 21/213; B60R 21/201; B60R 21/2342; B60R 21/23138; B60R 21/2165; B60R 21/214; B60R 2021/21506; B60R 2021/23538; B60R 2021/23576

USPC .............................. 280/728.2, 730.2
See application file for complete search history.

(56) References Cited

U.S. PATENT DOCUMENTS

| | | | |
|---|---|---|---|
| 5,899,486 A * | 5/1999 | Ibe .................. | B60R 21/232 280/730.2 |
| 6,435,543 B1 * | 8/2002 | Magoteaux ......... | B60R 21/2338 280/730.2 |
| 7,261,316 B1 | 8/2007 | Salmo et al. | |
| 8,608,193 B1 * | 12/2013 | Wysocki ............ | B60R 21/233 280/730.2 |
| 12,001,364 B2 | 6/2024 | O'Shea et al. | |

(Continued)

FOREIGN PATENT DOCUMENTS

| | | | | |
|---|---|---|---|---|
| DE | 102006049431 B4 * | 9/2011 | ........ | B60R 21/232 |
| DE | 102019212599 A1 * | 2/2021 | | |
| KR | 10-2022-0132928 A | 10/2022 | | |

OTHER PUBLICATIONS

Extended European Search Report issued on Dec. 2, 2025 in counterpart European Patent Application No. 24184523.9 (9 pages in English).

*Primary Examiner* — Keith J Frisby
(74) *Attorney, Agent, or Firm* — NSIP Law

(57) ABSTRACT

An airbag assembly includes an airbag cushion to be deployed downward and having an insertion hole formed in an upper end portion thereof and a mounting tab inserted into the insertion hole and fixed to a vehicle frame. The mounting tab is folded around a center portion thereof while inserted into the insertion hole, sides opposite to the center portion are fixed to each other so that the airbag cushion is hung on the mounting tab, and the mounting tab is rotatable in a state in which the airbag is hung thereon.

16 Claims, 8 Drawing Sheets

(56) References Cited

U.S. PATENT DOCUMENTS

| | | | |
|---|---|---|---|
| 2002/0014762 A1* | 2/2002 | Bakhsh | B60R 21/233 |
| | | | 280/730.2 |
| 2002/0036393 A1* | 3/2002 | Bakhsh | B60R 21/232 |
| | | | 280/730.2 |
| 2002/0036394 A1* | 3/2002 | Bakhsh | B60R 21/2338 |
| | | | 280/730.2 |
| 2002/0036395 A1* | 3/2002 | Bakhsh | B60R 21/232 |
| | | | 280/730.2 |
| 2004/0130128 A1* | 7/2004 | Bakhsh | B60R 21/237 |
| | | | 280/730.2 |
| 2005/0189743 A1* | 9/2005 | Bakhsh | B60R 21/232 |
| | | | 280/730.2 |
| 2006/0012156 A1* | 1/2006 | Boxey | B60R 21/232 |
| | | | 280/730.2 |
| 2006/0097492 A1* | 5/2006 | Bakhsh | B60R 21/232 |
| | | | 280/730.2 |
| 2011/0057422 A1* | 3/2011 | Cheal | B60R 21/201 |
| | | | 280/728.2 |
| 2011/0175333 A1 | 7/2011 | Mitchell et al. | |
| 2013/0093167 A1* | 4/2013 | Volkmann | B60R 21/232 |
| | | | 280/729 |
| 2020/0324730 A1 | 10/2020 | Lee | |

* cited by examiner

[FIG.2]
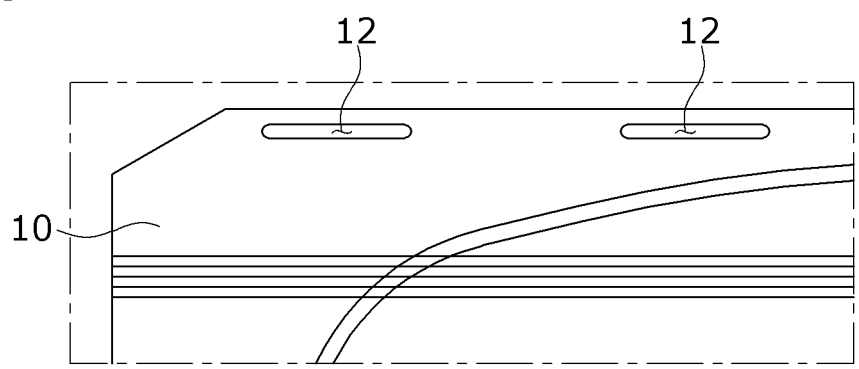

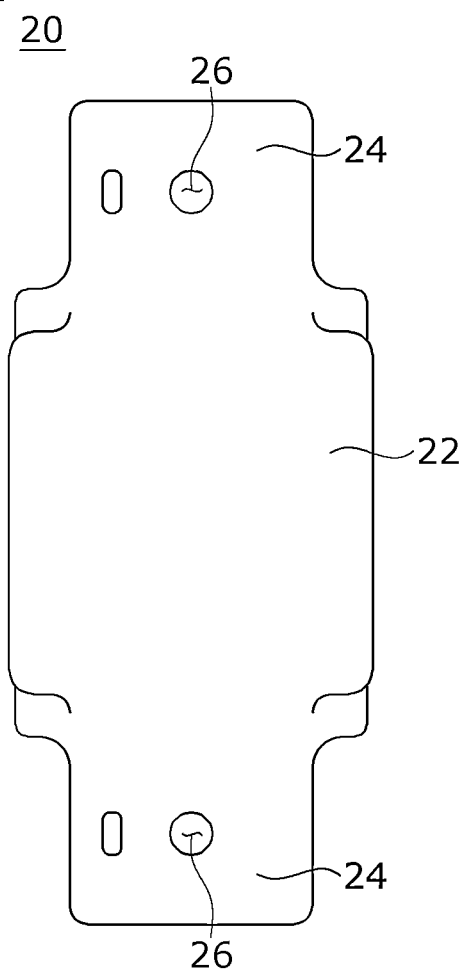

[FIG.4]
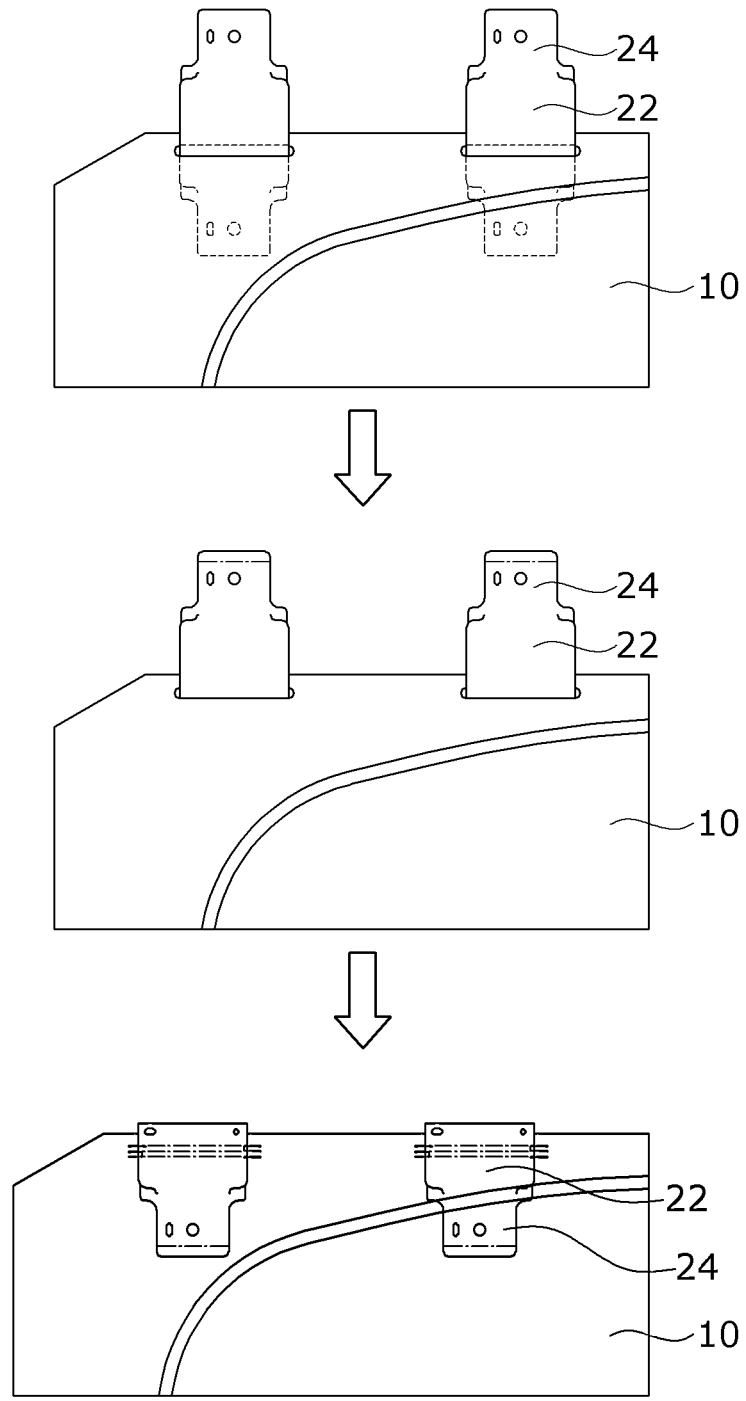

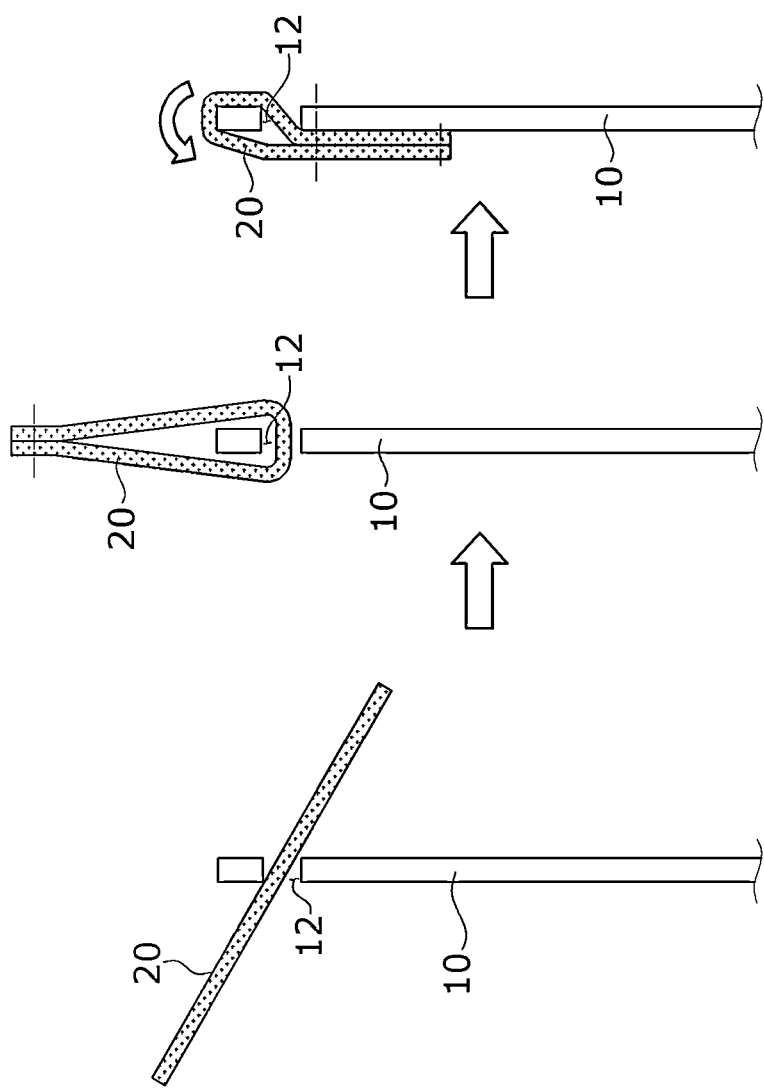

[FIG.6]
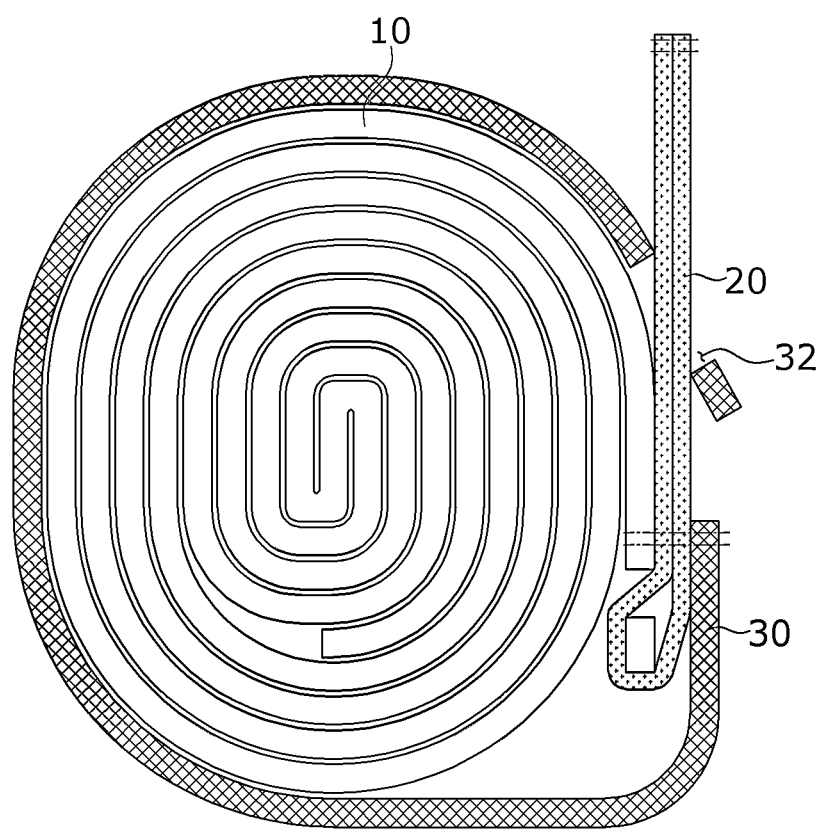

[FIG.7]
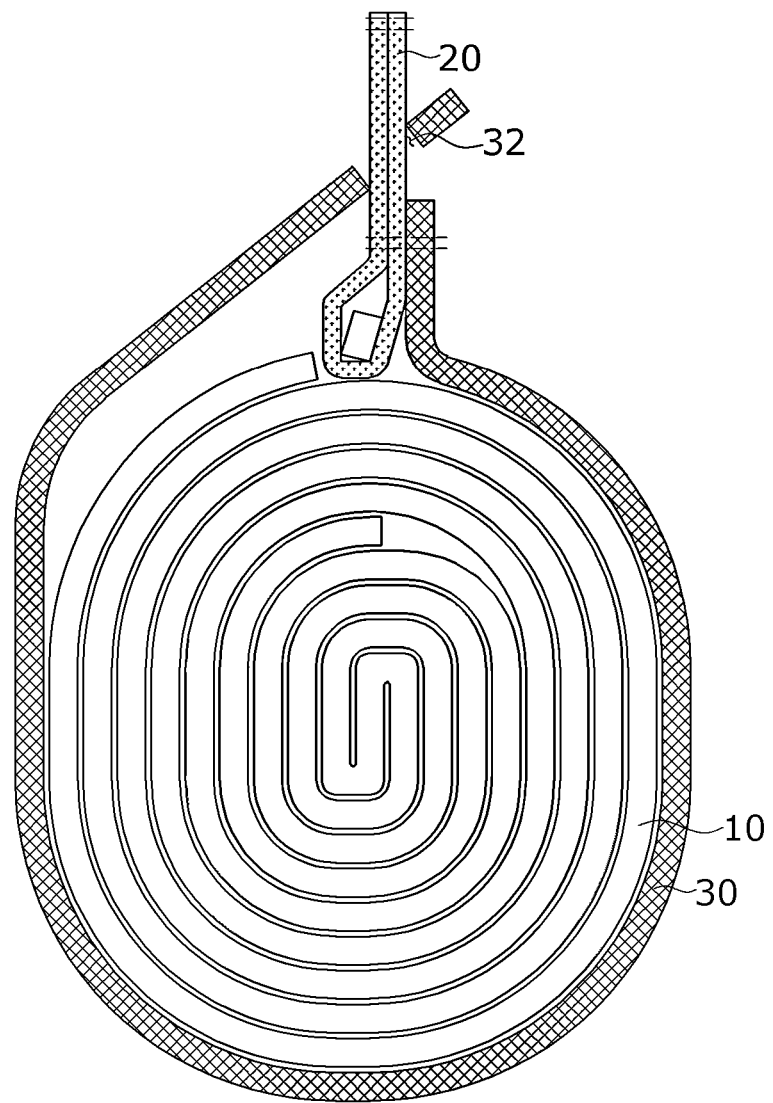

[FIG.8]
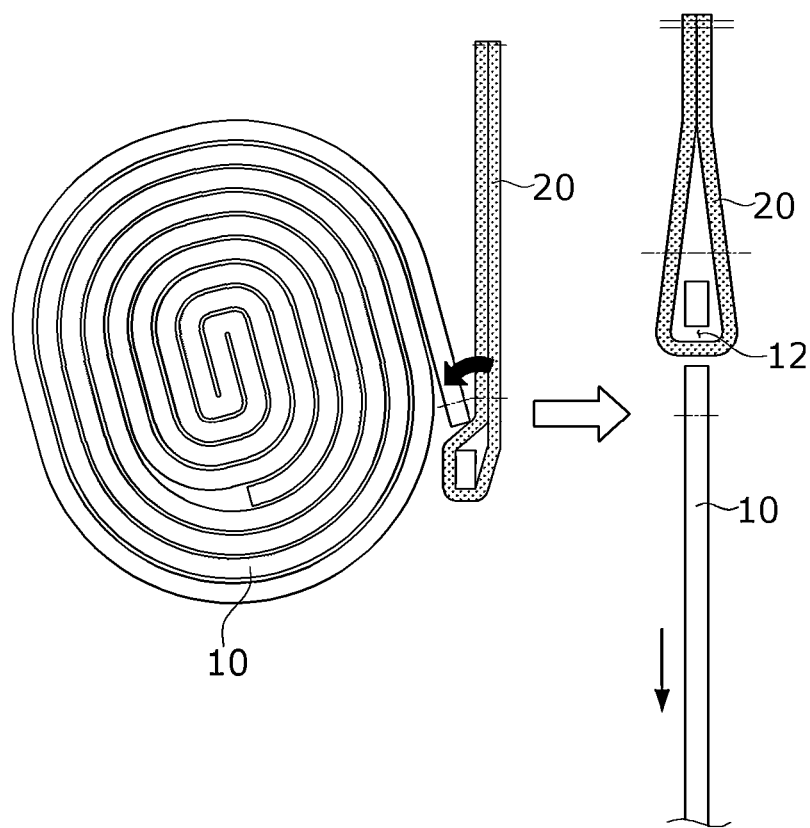

AIRBAG ASSEMBLY

CROSS-REFERENCE TO RELATED APPLICATION

This application claims priority to and the benefit of Korean Patent Application No. 10-2023-0150999, filed on Nov. 3, 2023, the disclosure of which is incorporated herein by reference in its entirety.

BACKGROUND

Field of the Invention

The present invention relates to an airbag assembly, and more specifically, to an airbag assembly which allows an airbag cushion to be easily deployed without folding because the deployment direction and folding direction of the airbag are parallel when an airbag is assembled in a vehicle.

Discussion of Related Art

A curtain airbag (CAB) assembled on a side of a passenger in a vehicle is deployed downward from an upper frame of the vehicle to prevent impacts that a passenger may receive from the side surface of the vehicle and prevent the passenger from being ejected from the vehicle.

The CAB is formed to cover both side surfaces of the front and rear seats and is formed long from front to back. The CAB, which covers the vehicle's side surface like a curtain, is rolled, folded, and assembled to a vehicle body.

A mounting tab and a strap are disposed at ends of the curtain airbag cushion for assembly to the vehicle to fix a rolled and folded curtain airbag module. The mounting tab may be assembled to the vehicle body using separate hardware to install the curtain airbag module in the right place.

However, in the case of the conventional CAB, the CAB sewn at ends of the mounting tab is fixed to face the top of the vehicle. When the airbag is deployed, the airbag may be bent downward and deployed. This deployment method has disadvantages of a loss in the length of the airbag cushion due to the folding of the airbag cushion and much shaking of the airbag cushion during deployment.

SUMMARY

The present invention is directed to providing an airbag assembly capable of reducing the variability of deployment performance and enhancing deployment.

The problems that the present invention aims to solve are not limited to those mentioned above, and other problems not mentioned here will be clearly understood by those skilled in the art from the following description.

According to an aspect of the present invention, there is provided an airbag assembly which includes: an airbag cushion that is deployed downward and includes an insertion hole formed in an upper end portion thereof; and a mounting tab inserted into the insertion hole and fixed to a vehicle frame, wherein the mounting tab is folded around a center portion thereof while inserted into the insertion hole, sides opposite to the center portion are fixed to each other so that the airbag cushion is hung on the mounting tab, and the mounting tab is rotatable in a state in which the airbag cushion is hung.

In a state in which the airbag cushion is hung on the mounting tab, the airbag cushion may be sewn to one end portion of the mounting tab, and the airbag cushion may be folded.

The mounting tab may include a tab body, and a tab head extending from both sides of the tab body and having a smaller width than the tab body, wherein the tab head may include a fixing hole for coupling to a vehicle frame.

After the airbag cushion is hung on the mounting tab, in a state in which the mounting tab is rotated to face a direction in which the airbag is disposed, the tab body may be sewn to the airbag cushion so that the mounting tab is fixed to the airbag cushion.

The mounting tab may be fixed to the airbag cushion, and then the airbag cushion may be rolled, folded, and assembled to a vehicle body.

When the airbag cushion is deployed, a part where the tab body and the airbag cushion are sewn may be broken, and the airbag cushion may rotate downward and may be deployed downward.

According to another aspect of the present invention, there is provided an airbag assembly which allows the airbag cushion to be rolled, folded, and assembled to the vehicle body in a state in which the mounting tab faces a direction opposite to a direction in which the airbag cushion is disposed after the airbag cushion is hung on the mounting tab.

The airbag assembly may further include a strap extending long from one surface of the mounting tab and having a through hole formed in one end portion thereof so that the tab head is inserted into the through hole, wherein the strap surrounds the folded airbag cushion and holds the folded airbag cushion by inserting the tab head into the through hole in a state in which the strap surrounds the airbag cushion.

The insertion hole is provided as a plurality of insertion holes at predetermined intervals, and the mounting tab is provided as a plurality of mounting tabs formed to correspond to the insertion holes.

The strap may be connected to one side of the tab body of the mounting tab, and the strap may be disposed on an outer side of the folded mounting tab by folding the mounting tab such that surfaces that are not connected to the strap face each other.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 2 is a view illustrating an airbag cushion of the airbag assembly according to the embodiment of the present invention;

FIG. 3 is a view illustrating a mounting tab according to the embodiment of the present invention;

FIG. 4 is a view illustrating the airbag cushion hung on the mounting tab according to the embodiment of the present invention;

FIG. 5 is a view illustrating the airbag cushion hung on the mounting tab according to the embodiment of the present invention;

FIG. 6 is a view illustrating a folded airbag cushion according to the embodiment of the present invention;

FIG. 7 is a view illustrating a folded airbag cushion according to another embodiment of the present invention; and FIG. 8 is a view illustrating the deployment of the airbag cushion according to the embodiment of the present invention.

DETAILED DESCRIPTION

Figure 1:
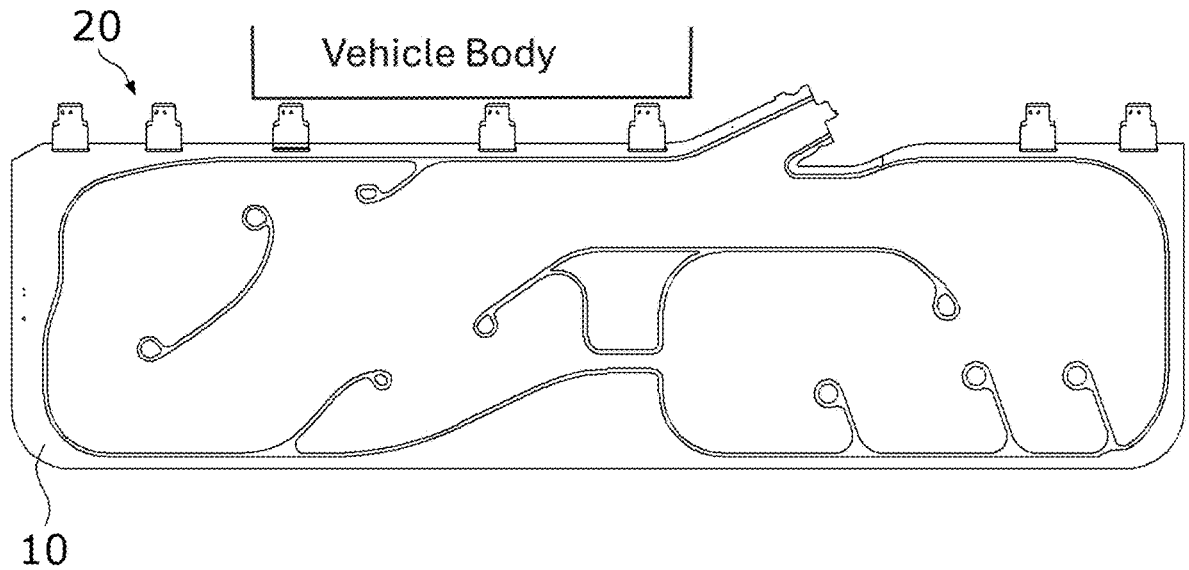
FIG. 1 is a view illustrating an airbag assembly according to an embodiment of the present invention.

While the invention is susceptible to various modifications and alternative forms, specific embodiments thereof will be shown by way of example in the accompanying drawings and described in detail therein. It should be understood, however, that there is no intent to limit the invention to the particular forms disclosed, but the invention is to cover all modifications, equivalents, and alternatives falling within the spirit and scope of the invention. In the description of the present invention, when it is deemed that a detailed description of the related art may obscure the gist of the present invention, the detailed description will be omitted Although the terms "first," "second," etc. may be used herein to describe various elements, these elements are not limited by the terms. The terms are only used to distinguish one element from another.

The terms used herein are for the purpose of describing particular embodiments only and are not intended to limit the invention. Singular expressions include plural expressions unless the context clearly indicates otherwise. It should be further understood that the terms "comprise," "comprising," "include," and/or "including" used herein specify the presence of stated features, numbers, steps, operations, elements, components or combinations thereof, but do not preclude the presence or addition of one or more other features, numbers, steps, operations, elements, components, or combinations thereof.

Furthermore, throughout the specification, when it is stated that components are "connected," this does not necessarily mean that two or more components are directly connected, but rather that they are indirectly connected through other components, connected physically or electrically, or referred to by different names based on their position or function, yet all are considered as being interconnected.

Also, when described as being formed or disposed "above or below" each component, "above or below" includes not only cases where two components are directly in contact with each other, but also cases where one or more other components are formed or disposed between the two components. Furthermore, when expressed as "above or below," it may include not only the upward direction but also the downward direction based on one component.

Hereinafter, an exemplary embodiment of the airbag assembly according to the present invention will be described in detail with reference to the accompanying drawings. In the description with reference to the accompanying drawings, identical or corresponding components will be given the same reference numerals, and redundant descriptions thereof will be omitted.

A curtain airbag (CAB) covers a side surface of a vehicle to protect passengers from danger such as side impacts and glass fragments and prevent passengers from being ejected from the vehicle. The CAB may unfold and may be deployed downward from an upper portion of the side surfaces of the vehicle, like a curtain, to cover the entire side surface.

A curtain airbag cushion 10 is formed long from front to back to cover both side surfaces of front and rear seats. Since the airbag cushion 10 is formed long from front to back, a folded airbag module is also formed long from front to back. The airbag module is coupled to an upper frame of the side surface of the vehicle body, and a mounting part disposed at one end portion of the folded airbag cushion 10 is coupled to the vehicle using separate hardware and assembled to the vehicle body.

Generally, curtain airbags are rolled, folded, and assembled. The conventional curtain airbag is rolled and folded, and a mounting tab 20 fixed to one end portion of a curtain airbag cushion 10 is coupled to a vehicle. A direction in which the folded airbag cushion 10 unfolds is opposite to a direction in which the airbag cushion 10 is folded, and the airbag cushion 10 is deployed in a folded state.

When the airbag cushion 10 is deployed in the folded state, since a loss in the length of the airbag cushion 10 occurs, the airbag cushion 10 should be formed longer downward. Due to the folded portion, pressure increases, and the cushion's shaking becomes greater during deployment. Deviations occur in each curtain airbag module due to lack of uniform deployment.

That is, since it is advantageous for the airbag module to be deployed along a vehicle body surface on a side surface of the vehicle, the present invention provides an airbag assembly capable of smoothly unfolding by changing a structure of the mounting tab 20 and the airbag cushion 10 so that a direction in which the airbag is deployed is the same as a direction in which the airbag is folded.

FIG. 1 is a view illustrating an airbag assembly according to an embodiment of the present invention, and FIG. 2 is a view illustrating an airbag cushion of the airbag assembly according to the embodiment of the present invention.

Referring to FIGS. 1 and 2, the airbag assembly according to the embodiment of the present invention may include an airbag cushion 10 that is deployed downward and has an insertion hole 12 formed in an upper end portion thereof, and a mounting tab 20 inserted into the insertion hole 12 and fixed to a vehicle frame.

The mounting tab 20 is inserted into the insertion hole 12 and folded around a center portion thereof, and the opposite sides of the center portion are fixed to each other, such that the airbag cushion 10 may be hung. When the airbag cushion 10 is hung on the mounting tab 20, the airbag cushion 10 may rotate around the mounting tab 20. That is, the folded mounting tab 20 is rotatable in the insertion hole 12.

When the airbag cushion 10 rotates, during the deployment of the airbag, the folded airbag cushion 10 rotates downward and is deployed. Since the deployment direction of the airbag cushion 10 is parallel to the folding direction of the airbag cushion 10, the airbag cushion 10 may be smoothly deployed without folding.

The insertion hole 12 formed on the airbag cushion 10 may be formed in a long hole shape, and the plurality of insertion holes 12 may be disposed in an upper end portion of the airbag cushion 10 at predetermined intervals. Generally, since the plurality of mounting tabs 20 are fixed to the airbag cushion 10 and the airbag module is coupled to the vehicle, the insertion holes 12 may be formed to correspond to a number of the mounting tabs 20.

FIG. 3 is a view illustrating the mounting tab according to the embodiment of the present invention, FIG. 4 is a view illustrating the airbag cushion being hung on the mounting tab according to the embodiment of the present invention, and FIG. 5 is a view illustrating the airbag cushion being hung on the mounting tab according to the embodiment of the present invention.

Referring to FIG. 3, the mounting tab 20 according to the embodiment of the present invention may include a tab body 22 and a tab head 24 extending from one side of the tab body 22 and formed with a smaller width than the tab body 22.

In the case of a conventional mounting tab 20, the tab head 24 extends from one side of the tab body 22, and the mounting tab 20 is sewn and fixed to one side of the airbag cushion 10. In the present invention, the mounting tab 20 may be formed with a tab head 24 that extends from each side of the tab body 22.

As shown in FIG. 3, since the mounting tab 20 is formed with tab heads 24 extending from both sides of the tab body 22, the mounting tab 20 may be formed symmetrically around the center portion thereof. When the mounting tab 20 is formed symmetrically and folded around the center portion, the symmetrical parts correspond accurately.

In the embodiment, although it is shown that the tab heads 24 have the same shape, the tab heads 24 may have different shapes, or the mounting tab 20 may not have a symmetrical shape.

The tab head 24 may have a fixing hole 26 to be coupled to the vehicle. Separate hardware is inserted into the fixing hole 26 to connect the mounting tab 20 to the vehicle.

Referring to FIGS. 4 and 5, the sequence of hanging the airbag cushion 10 on the mounting tab 20 may be shown. FIGS. 4 and 5 are shown to correspond to each other sequentially.

As shown in the first drawings in FIGS. 4 and 5, the mounting tab 20 is inserted into the insertion hole 12 formed in the airbag cushion 10. Since the mounting tab 20 will be folded after the insertion, an insertion direction of the mounting tab 20 is not limited. A width of the insertion hole 12 may be formed to correspond to a width of the mounting tab 20. More specifically, since a width of the tab body 22 of the mounting tab 20 is relatively wide, the insertion hole 12 may be formed to correspond to the width of the tab body 22.

As shown in the second drawing, the mounting tab 20 inserted into the insertion hole 12 is folded in half, and the ends of the mounting tab 20 are sewn. The embodiment shows that the mounting tab 20 has a symmetrical shape, and the tab heads 24, which have the same shape, are formed on both sides of the mounting tab 20. The mounting tab 20 may be folded in half around the center portion thereof while inserted into the insertion hole 12.

Since portions opposite to the center portion of the mounting tab 20 are fixed to each other, at least a portion of the tab head 24 may be fixed. When the mounting tab 20 is folded, the tab heads 24 are disposed to face each other, and at least a portion of the tab head 24 may be fixed, such as by sewing, and thus the airbag cushion 10 may be hung on the mounting tab 20.

The mounting tab 20, of which at least a portion are fixed after being folded, has a ring shape and is rotatable in the insertion hole 12 of the airbag cushion 10. As shown in the third drawing, the mounting tab 20, of which one side is sewn, rotates in a direction in which the airbag cushion 10 is disposed and may be placed on the airbag cushion 10. Thereafter, the mounting tab 20 may be fixed to the airbag cushion 10 using a method of sewing at least portion of the tab body 22 of the mounting tab 20 to the airbag cushion 10. The fixing method does not matter as long as the method may keep the airbag cushion 10 and mounting tab 20 fixed in addition to sewing.

However, as will be described below, when the airbag is deployed, the fixed parts of the mounting tab 20 and the airbag cushion 10 may be separated so that the airbag cushion 10 rotates and unfolds downward. Therefore, it is necessary to avoid excessively strong fixing.

The reason for fixing the airbag cushion 10 and the mounting tab 20 is to use a conventional airbag folding method and device as is. Conventionally, a separate airbag folding device was used to fold the airbag cushion 10 into a rolled form. Although there are changes in the fixing structure between the mounting tab 20 and the airbag cushion 10 in the present invention, the airbag cushion 10 may be folded using the same device, which facilitates easy manufacturing of a curtain airbag module.

FIG. 6 is a view illustrating a folded airbag cushion according to the embodiment of the present invention.

Referring to FIG. 6, the airbag assembly according to the embodiment of the present invention may further include a strap 30 extending long from one surface of the mounting tab 20 and having a through hole 32 formed in one end portion the strap 30 so that the tab head 24 is inserted thereinto. The strap 30 surrounds the folded airbag cushion 10, and at least a portion of the mounting tab 20 is inserted into the through hole 32 formed in one end portion of the strap 30 and holds the airbag cushion 10.

After the mounting tab 20 folded in half is fixed to the airbag cushion 10, the airbag cushion 10 is rolled and folded, the strap 30 is disposed along an outer surface of the rolled and folded airbag cushion 10 to surround the airbag cushion 10.

As shown in FIG. 6, the strap 30 may be fixed to and extend from one surface of the mounting tab 20. The strap 30 is disposed at a portion corresponding to an outer surface when the mounting tab 20 is folded in half. The strap 30 may surround the airbag cushion 10, may be hung on the mounting tab 20, and may surround the airbag cushion 10 by being disposed on the outer side of the folded mounting tab 20.

The strap 30 may be simultaneously disposed and fixed at a fixing portion where the airbag cushion 10 and the tab body 22 of the mounting tab 20 are sewn. Because the airbag cushion 10 is detached from the mounting tab 20 and deployed when the airbag is deployed and the strap 30 is a component that is broken when the airbag is deployed, there is no problem even when the airbag cushion 10, the mounting tab 20, and the strap 30 are fixed to the same portion. In a side view, the airbag cushion 10, the mounting tab 20, and the strap 30 are disposed sequentially.

In FIG. 6, the vehicle body is disposed on the right side, and the interior space of the vehicle where passengers sit is formed on the left side. That is, in FIG. 6, the right side of the mounting tab may be fixed in contact with the vehicle frame.

The strap 30 includes the through hole 32 so that at least a portion of the mounting tab 20 may be inserted thereinto. Since the tab head 24 of the mounting tab 20 is disposed at an upper side of the mounting tab 20 in FIG. 6, the tab head 24 may be inserted into the through hole 32 to fix the strap 30.

FIG. 7 is a view illustrating a folded airbag cushion according to another embodiment of the present invention.

Referring to FIG. 7, a mounting tab 20 of an airbag assembly according to another embodiment of the present invention may be assembled to a vehicle without separate fixation such as being sewn to an airbag cushion 10. The present invention includes a feature in which the unfolding direction of the airbag cushion 10 and the folding direction of the airbag cushion 10 are parallel, which can be achieved by a structure in which the airbag cushion 10 is hung on the mounting tab 20 and is rotatable. That is, when the airbag cushion 10 is disposed on a lower side of the mounting tab 20, the airbag cushion 10 may be deployed downward, and the folding direction of the airbag cushion 10 is parallel to the unfolding direction of the folded airbag cushion 10, and thus the airbag cushion 10 may be easily deployed.

In the above-described airbag assembly according to the embodiment of the present invention, after the mounting tab 20 is fixed in a rotated state in the direction in which the airbag cushion 10 is disposed, the airbag cushion 10 is folded. However, it is to utilize equipment such as conventional folding devices, and unless such advantages are required, there is no need to fix the mounting tab 20 to the airbag cushion 10.

In the embodiment, as shown in the second drawing of FIG. 4, after the airbag cushion 10 is folded in a state in which the mounting tab 20 is disposed in a direction opposite to the airbag cushion 10, the airbag cushion 10 may be fixed by the separate strap 30. Since the airbag cushion 10 is folded in a state of being hung on a lower side of the mounting tab 20, the overall height of the airbag module becomes greater, but a process of fixing the airbag cushion 10 to the mounting tab 20 may be omitted. In the fixation method, since the airbag cushion 10 is detached during the deployment of the airbag, deviations in airbag deployment can be reduced by omitting the fixation process.

FIG. 8 is a view illustrating the deployment of the airbag cushion according to the embodiment of the present invention.

Referring to FIG. 8, when the airbag is deployed, the fixed portions of the airbag cushion 10 and the mounting tab 20 are separated, and the airbag is deployed. In the drawing, the strap 30 is not shown.

When the airbag is deployed, the airbag cushion 10 is inflated by strong pressure of gas supplied from the inflator (not shown). In this case, as shown in the left drawing, the fixed portions of the airbag cushion 10 and the tab body 22 may be separated. Since the airbag cushion 10 and the mounting tab 20 may rotate in a state coupled to each other, the airbag cushion 10 may rotate downward with respect to the mounting tab 20 fixed to the vehicle.

When the airbag cushion 10 rotates downward, the airbag cushion 10 may unfold downward as shown in the right drawing. When the airbag cushion 10 unfolds while rotating downward, the unfolding direction of the rolled and folded airbag cushion 10 and the deployment direction of the airbag cushion 10 are the same. That is, the airbag cushion 10 may be deployed without folding.

When the airbag cushion 10 is deployed without folding, a loss in the length of the airbag cushion 10 and deviations in deployment during operation of each airbag module do not occur, and the airbag cushion 10 can be more smoothly deployed along the side of the vehicle body without shaking.

According to embodiments of the present invention, an airbag cushion is rotatably hung on a mounting tab, and when an airbag is deployed, the airbag cushion is deployed without folding in a downward rotation state, thereby increasing deployment performance and reducing deviations in deployment.

The various and beneficial advantages and effects of the present invention are not limited to the above-described content, and may be more easily understood through the description of specific embodiments of the present invention.

Although the specific embodiments of the present invention have been described above, those skilled in the art will understand that various modifications and changes can be made to the present invention without departing from the scope of the claims set forth below.

What is claimed is:

1. An airbag assembly comprising:
   an airbag cushion configured to be deployed downward and including an insertion hole disposed in an upper end portion thereof; and
   a mounting tab inserted into the insertion hole and fixed to a vehicle frame,
   wherein the mounting tab is folded around a center portion thereof while inserted into the insertion hole, sides opposite to the center portion are fixed to each other so that the airbag cushion is hung on the mounting tab, and the mounting tab is rotatable in a state in which the airbag cushion is hung thereon, and
   wherein, in the state in which the airbag cushion is hung on the mounting tab, the airbag cushion is sewn to one end portion of the mounting tab, and the airbag cushion is folded.

2. The airbag assembly of claim 1, wherein the mounting tab includes:
   a tab body; and
   a tab head extending from both sides of the tab body and having a smaller width than the tab body,
   wherein the tab head includes a fixing hole configured to be coupled to the vehicle frame.

3. The airbag assembly of claim 2, wherein, after the airbag cushion is hung on the mounting tab, in a state in which the mounting tab is rotated to face a direction in which the airbag is disposed, the tab body is sewn to the airbag cushion so that the mounting tab is fixed to the airbag cushion.

4. The airbag assembly of claim 3, wherein, after the mounting tab is fixed to the airbag cushion, the airbag cushion is rolled, folded, and assembled to a vehicle body.

5. The airbag assembly of claim 4, wherein, when the airbag cushion is deployed, a part at which the tab body and the airbag cushion are sewn is broken, and the airbag cushion rotates downward and is deployed downward.

6. The airbag assembly of claim 2, wherein, after the airbag cushion is hung on the mounting tab, in a state in which the mounting tab faces a direction opposite to a direction in which the airbag cushion is disposed, the airbag cushion is rolled, folded, and assembled to a vehicle body.

7. The airbag assembly of claim 6, further comprising a strap extending from one surface of the mounting tab and having a through hole formed in one end portion thereof so that the tab head is inserted into the through hole,
   wherein the strap surrounds the folded airbag cushion and holds the folded airbag cushion by inserting the tab head into the through hole in a state in which the strap surrounds the airbag cushion.

8. The airbag assembly of claim 7, wherein the insertion hole comprises a plurality of insertion holes formed at predetermined intervals, and the mounting tab comprises a plurality of mounting tabs corresponding to the insertion holes.

9. The airbag assembly of claim 7, wherein the strap is connected to one side of the tab body of the mounting tab, and
   the strap is disposed on an outer side of the folded mounting tab by folding the mounting tab such that surfaces that are not connected to the strap face each other.

10. An airbag assembly comprising:
    an airbag cushion configured to be deployed downward and including an insertion hole disposed in an upper end portion thereof; and a mounting tab inserted into the insertion hole and fixed to a vehicle frame, wherein the mounting tab is folded around a center portion thereof while inserted into the insertion hole, sides opposite to the center portion are fixed to each other so that the airbag cushion is hung on the mounting tab, and the mounting tab is rotatable in a state in which the airbag cushion is hung thereon, wherein the mounting tab includes:
a tab body; and
a tab head extending from both sides of the tab body and having a smaller width than the tab body, wherein the tab head includes a fixing hole configured to be coupled to the vehicle frame, and wherein, after the airbag cushion is hung on the mounting tab, in a state in which the mounting tab is rotated to face a direction in which the airbag is disposed, the tab body is sewn to the airbag cushion so that the mounting tab is fixed to the airbag cushion.

11. The airbag assembly of claim 10, wherein, after the mounting tab is fixed to the airbag cushion, the airbag cushion is rolled, folded, and assembled to a vehicle body.

12. The airbag assembly of claim 11, wherein, when the airbag cushion is deployed, a part at which the tab body and the airbag cushion are sewn is broken, and the airbag cushion rotates downward and is deployed downward.

13. The airbag assembly of claim 10, wherein, after the airbag cushion is hung on the mounting tab, in a state in which the mounting tab faces a direction opposite to a direction in which the airbag cushion is disposed, the airbag cushion is rolled, folded, and assembled to a vehicle body.

14. The airbag assembly of claim 13, further comprising a strap extending from one surface of the mounting tab and having a through hole formed in one end portion thereof so that the tab head is inserted into the through hole, wherein the strap surrounds the folded airbag cushion and holds the folded airbag cushion by inserting the tab head into the through hole in a state in which the strap surrounds the airbag cushion.

15. The airbag assembly of claim 14, wherein the insertion hole comprises a plurality of insertion holes formed at predetermined intervals, and the mounting tab comprises a plurality of mounting tabs corresponding to the insertion holes.

16. The airbag assembly of claim 15, wherein the strap is connected to one side of the tab body of the mounting tab, and the strap is disposed on an outer side of the folded mounting tab by folding the mounting tab such that surfaces that are not connected to the strap face each other.

* * * * *